March 27, 1951     H. D. CLEMMONS     2,546,213
FLUSH VALVE
Filed May 11, 1945
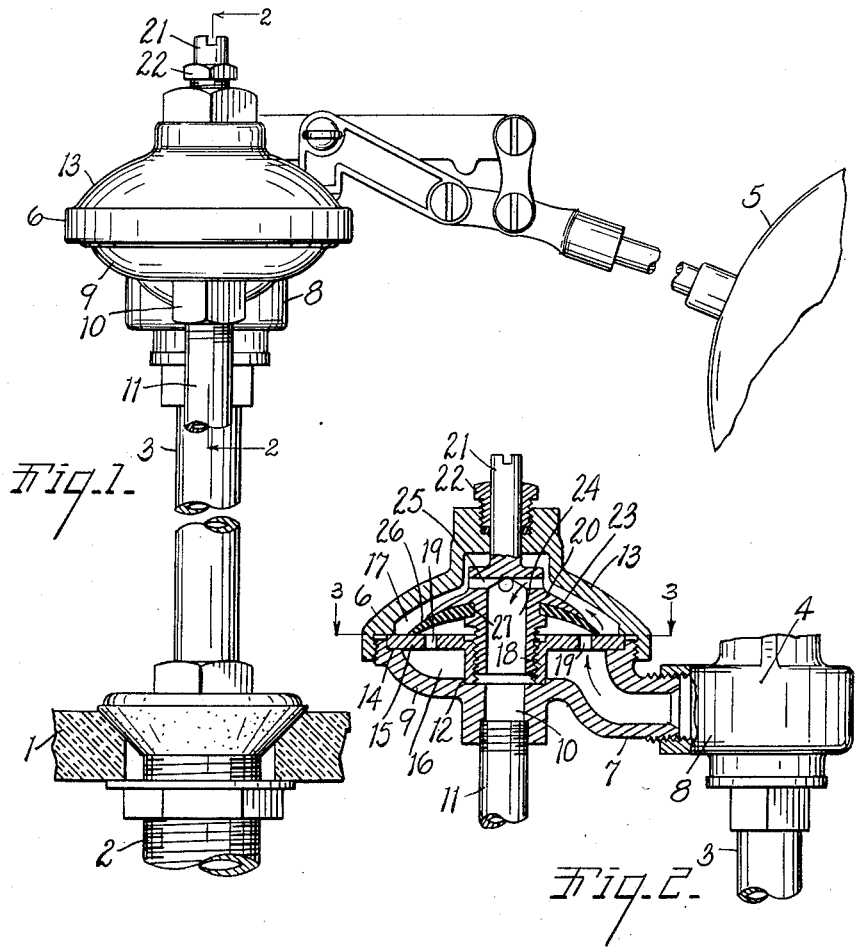
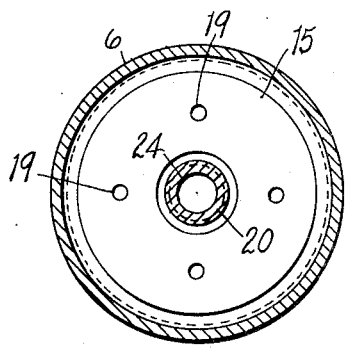
INVENTOR.
Herbert D. Clemmons
BY Earl F. Chappell
ATTORNEYS.

Patented Mar. 27, 1951

2,546,213

UNITED STATES PATENT OFFICE 2,546,213

FLUSH VALVE

Herbert D. Clemmons, Sturgis, Mich., assignor to Scovill Manufacturing Company, Waterbury, Conn.

Application May 11, 1945, Serial No. 593,255

11 Claims. (Cl. 251—119)

The main objects of this invention are:

First, to provide in a ball cock or flush valve an auxiliary valve constituting an effective silencing and anti-siphoning means.

Second, to provide a valve structure of the class described which may be adjusted to meet varying conditions in water pressures and the like and one which is highly efficient and retains its efficiency through a long period.

Third, to provide a structure having these advantages which is simple and compact and economical to produce and easily adjusted.

Objects relating to details and economies of the invention will appear from the description to follow. The invention is defined and pointed out in the claims.

A preferred embodiment of the invention is illustrated in the accompanying drawing, in which:

Fig. 1 is a fragmentary elevational view of a ball cock embodying the features of my invention.

Fig. 2 is a fragmentary view partially in vertical section on line 2—2 of Fig. 1.

Fig. 3 is a horizontal section on line 3—3 of Fig. 2.

In the embodiment of my invention illustrated I designates a flushing tank, 2 the supply pipe, and 3 a riser within the tank terminating with a ball cock mechanism designated generally by the numeral 4 and including a float 5. Inasmuch as the details of this ball cock form no part of my present invention I have not illustrated the same herein.

The valve of my invention, in the embodiment illustrated, comprises a casing designated generally by the numeral 6 having a laterally projecting inlet arm 7 connected to the ball cock valve casing 8.

The casing 6 comprises a cup-like bottom member 9, the inlet 7 being integral with this bottom member. The bottom member has a discharge or outlet 10 into which the discharge pipe 11 is threaded. This outlet is surrounded by the internal annular shoulder 12. The cap-like top portion 13 of the casing 6 is internally threaded to engage external coacting threads on the bottom member or casing.

The bottom member or casing has an upwardly facing shoulder 14 in which is seated the valve plate 15. This valve plate constitutes a partition across the casing, the portion 16 below the partition constituting an inlet chamber and the portion 17 above the plate an outlet chamber. This valve plate is provided with a tubular extension 18 seated in the shoulder 12. The valve plate has a series of uniformly spaced ports 19 connecting the lower or inlet chamber with the chamber 17.

The valve body member 20 is threaded into the tubular extension of the valve plate for adjustment therein, being provided with an adjusting stem 21 projecting through the top of the casing and provided with a packing gland 22. This valve body member is provided with an annular downwardly facing concave flange 23 and with a discharge passage 24 opening to the chamber 17 through the lateral passages or ports 25, these ports being above the flange 23. The concavo-convex valve 26 is arranged in supported relation to this flange 23 to project beyond the edges thereof and engage the valve plate at the outside of the ports 19.

The valve body is provided with an annular groove 27 receiving the inner edge of the valve and supporting it in contacting relation to the flange. This valve is preferably formed of a resilient material such as rubber and is of outwardly tapering section. The water flowing through the inlet 7 passes through the ports 19 and lifts the valve from the valve plate—that is, it flows between the edges of the valve and the valve plate.

The valve may be adjusted according to the pressure under which the structure is to operate. It serves as an effective silencing means and also as an anti-siphoning means as any suction in the supply pipe 3 tends to draw the valve firmly into seating relation with the valve plate. The structure is highly efficient under a wide range of adaptations or installment conditions.

I have illustrated and described my invention as I have embodied the same in a highly practical embodiment thereof. I have not attempted to illustrate or describe other embodiments or adaptations as it is believed that this disclosure will enable those skilled in the art to embody or adapt my improvements as may be desired.

Having thus described my invention, what I claim as new and desire to secure by Letters Patent, is:

1. In a silencing and anti-siphoning valve for flush valve assemblies, the combination of a chambered casing comprising a bottom member externally threaded at the top thereof and provided with an annular upwardly facing shoulder at its upper edge and with an inlet and having a central outlet at the bottom thereof, there being an annular shoulder surrounding said outlet, a top casing member threaded upon said bottom member, a valve plate seated on said shoulder at the top of said casing member and clamped thereon by said top member, said valve plate having an internally threaded depending neck portion seated within said shoulder surrounding said outlet, said valve plate constituting a partition for said chamber and having a plurality of spaced ports therein, a valve body member threaded into said valve plate for vertical adjustment and having an adjusting stem projecting from said casing, said valve body member having an annular concave flange and a longitudinal passage opening to said outlet and to said casing above said flange, and a resilient concavo convex valve of outwardly tapered section mounted on said valve body member in supported relation to its said flange with the edge of the valve projecting beyond the edge of the flange and yieldingly engaging said valve plate at the outside of its said ports.

2. In a silencing and anti-siphoning valve for flush valve assemblies, the combination of a chambered casing comprising a bottom member provided with an inlet and having a central outlet at the bottom thereof, a top casing member secured to said bottom member, a valve plate clamped between said casing members, said valve plate having a depending neck portion communicating with said outlet, said valve plate constituting a partition for said chamber and having a plurality of spaced ports therein, a valve body member threaded into said valve plate for vertical adjustment and having an adjusting stem projecting from said casing, said valve body member having an annular concave flange and a longitudinal passage opening to said outlet and to said casing above said flange, and a resilient concavo convex valve of outwardly tapered section mounted on said valve body member in supported relation to its said flange with the edge of the valve projecting beyond the edge of the flange and yieldingly engaging said valve plate at the outside of its said ports.

3. In a silencing and anti-siphoning valve for flush valve assemblies, the combination of a chambered casing comprising a bottom member externally threaded at the top thereof and provided with an annular upwardly facing shoulder at its upper edge and with an inlet and having a central outlet at the bottom thereof, there being an annular shoulder surrounding said outlet, a top casing member threaded upon said bottom member, a valve plate seated on said shoulder at the top of said casing member and clamped thereon by said top member, said valve plate having an internally threaded depending neck portion seated within said shoulder surrounding said outlet, said valve plate constituting a partition for said chamber and having a plurality of spaced ports therein, a valve body member threaded into said valve plate for vertical adjustment, said valve body member having an annular flange and a longitudinal passage opening to said outlet and to said casing above said flange, and a resilient valve mounted on said valve body member in supported relation to its said flange with the edge of the valve projecting beyond the edge of the flange and yieldingly engaging said valve plate at the outside of its said ports.

4. In a silencing and anti-siphoning valve for flush valve assemblies, the combination of a chambered casing comprising a bottom member provided with an inlet and having a central outlet at the bottom thereof, a top casing member secured to said bottom member, a valve plate clamped between said casing members, said valve plate having a depending neck portion communicating with said outlet, said valve plate constituting a partition for said chamber and having a plurality of spaced ports therein, a valve body member threaded into said valve plate for vertical adjustment, said valve body member having an annular flange and a longitudinal passage opening to said outlet and to said casing above said flange, and a resilient valve body member mounted on said valve body member in supported relation to its said flange with the edge of the valve projecting beyond the edge of the flange and yieldingly engaging said valve plate at the outside of its said ports.

5. A flush valve comprising a chambered casing provided with an inlet and an outlet, a valve plate constituting a partition between said inlet and outlet and having a central passage member communicating with said outlet and a plurality of spaced ports, a valve body member threaded into said valve plate for adjustment and having an adjusting stem projecting from said casing, said body member having an annular concave flange facing said valve plate and a longitudinal passage in communication with said outlet and opening to said casing above said valve plate, and a resilient concavo convex valve of outwardly tapered section mounted on said valve body member in supported relation to its said flange with its edge projecting beyond the edge of the flange and yieldingly engaging said valve plate at the outside of said ports therein.

6. A flush valve comprising a chambered casing provided with an inlet and an outlet, a valve plate constituting a partition between said inlet and outlet and having a passage member communicating with said outlet and a plurality of spaced ports, a valve body member threaded into said passage member for adjustment, said body member having a longitudinal passage in communication with said outlet and opening to said casing above said valve plate, and a resilient valve mounted on said valve body member with its edge yieldingly engaging said valve plate at the outside of said ports therein.

7. In a structure of the class described, the combination of a casing, a valve plate constituting a partition in said casing, one side of said valve plate constituting with said casing an inlet chamber and the other side with said casing constituting an outlet chamber, said valve plate having delivery ports, a valve body member adjustable relative to said valve plate and having an annular concavo convex flange facing said valve plate, and a resilient concavo convex valve of outwardly tapered section mounted on said valve body member in supported relation to its said flange with the edge of the valve projecting beyond the edge of the flange and yieldingly engaging said valve plate at the outside of its said ports, said valve being of a relatively soft material to facilitate a cushion-like engagement with said valve plate, and a discharge passageway for said out'et chamber including a longitudinal passage through said valve body member.

8. In a structure of the class described, the combination of a casing, a valve plate constituting a partition in said casing, one side of said valve plate constituting with said casing an inlet chamber and the other side with said casing constituting chamber, said valve plate having delivery ports, a valve body member adjustable relative to said valve plate and having an annular flange, and a resilient valve mounted on said valve body member in supported relation to its said flange with the edge of the valve projecting beyond the edge of the flange and yieldingly engaging said valve plate at the outside of its said ports, said valve being of a relatively soft material to facilitate a cushion-like engagement with said valve plate, and a discharge passageway for said outlet chamber including a longitudinal passage through said valve body member.

9. In a structure of the class described, the combination of a casing having an outlet, a valve plate constituting a partition in said casing and having a port therein, said casing having an inlet at one side of said valve plate, a valve body member disposed on the other side of said valve plate for adjustment relative thereto and having an annular flange spaced from said valve plate, said valve body member having a longitudinal passage opening to said casing on that side of the valve plate opposite from said inlet and in communication with said outlet for said casing, said port establishing communication through said valve plate between said inlet and said longitudinal passage, and a resilient concavo convex valve of outwardly tapered section mounted on said valve body in supported relation to its said flange with the edges of the valve projecting beyond the edge of the flange and yieldingly engaging said valve plate at the outside of its said port, the concave side of said valve facing said valve plate.

10. In a structure of the class described, the combination of a casing, a valve plate constituting a partition in said casing and having a port therein and providing inlet and outlet chambers in the casing on the opposite sides of said valve plate, an inlet passageway delivering to said inlet chamber, and a discharge passageway delivering from said outlet chamber, a valve body member disposed on the outlet chamber side of said valve plate, and a resilient concavo convex valve of outwardly tapered section mounted on said valve body member in facing relation to said valve plate and with the edge yieldingly engaging said valve plate at the outside of its said port, the concave side of said valve facing said valve plate, said discharge passageway for the outlet chamber being disposed to discharge centrally through said valve body member, valve and valve plate.

11. In a structure of the class described, the combination of a casing, a valve plate constituting a partition in said casing and having a port therein and providing inlet and outlet chambers in the casing on the opposite sides of said valve plate, an inlet passageway delivering to said inlet chamber, and a discharge passageway delivering from said outlet chamber, a valve body member disposed on the outlet chamber side of said valve plate, and a resilient dished valve mounted on said valve body member in facing relation to said valve plate and with the edge yieldingly engaging said valve plate at the outside of its said port, the dished side of said valve facing said valve plate, said discharge passageway for the outlet chamber being disposed to discharge centrally through said valve body member, valve and valve plate.

HERBERT D. CLEMMONS.

REFERENCES CITED

The following references are of record in the file of this patent:

UNITED STATES PATENTS

| Number | Name | Date |
| --- | --- | --- |
| 538,802 | Sullivan | May 7, 1895 |
| 968,963 | Long | Aug. 30, 1910 |
| 985,362 | McKeown | Feb. 28, 1911 |
| 2,057,624 | Burkhart | Oct. 13, 1936 |
| 2,280,411 | Kiene | Apr. 21, 1942 |
| 2,290,145 | Owens | July 14, 1942 |
| 2,306,508 | Svirsky | Dec. 29, 1942 |
| 2,326,651 | Husted | Aug. 10, 1943 |
| 2,329,960 | Verheul | Sept. 21, 1943 |
| 2,348,097 | Smith | May 2, 1944 |